W. Leonard,
Horse Collar,
N°. 68,369.    Patented Sep. 3, 1867.
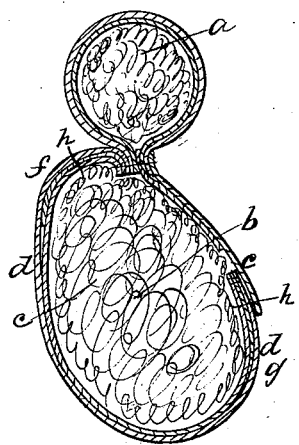
Witnesses.
G. H. Smith,
Wm Steel Jr
Inventor
Wm Leonard.
by Crosby, Halsted & Gould
his Attorneys

United States Patent Office.

WILLIAM LEONARD, OF BOSTON, MASSACHUSETTS.

Letters Patent No. 68,369, dated September 3, 1867.

---

IMPROVEMENT IN HORSE-COLLARS.

---

The Schedule referred to in these Letters Patent and making part of the same.

---

TO ALL WHOM IT MAY CONCERN:

Be it known that I, WILLIAM LEONARD, of Boston, in the county of Suffolk, and State of Massachusetts, have invented an Improvement in Horse-Collars; and I do hereby declare that the following, taken in connection with the drawings which accompany and form part of this specification, is a description of my invention sufficient to enable those skilled in the art to practise it.

The invention relates to the construction of the collar with reference to the employment of vulcanized rubber, or its compounds, for the bearing surfaces thereof.

The object of employing the rubber is to prevent absorption of perspiration from the body of the animal by and into the stuffing of the collar, and to obviate the formation of permanent wrinkles in that surface of the collar which comes into contact with the skin of the animal; and I consider the rubber beneficial for the cure of skin-galls, by reason of the healing influence of the sulphur contained in the vulcanized material.

In my construction, after having formed the roll and stuffed the body of the collar, as usual, and having cut the strip of rubber to the proper form, I cement all along each edge of the rubber, on the surface thereof which is to be innermost, a long narrow strip of leather, and having thus prepared the rubber, I draw it over the stuffing or body and stitch it to the flap or edge extending from the roll, running the stitches through the leathered edge of the rubber, so that in drawing the rubber tightly over the stuffing they will not cut through the rubber, as they will invariably incline to do if the leather strip is not used. Before securing the rubber in place, however, I interpose between it and the stuffing a layer or sheet of kersey cloth, which forms a soft cushion for the rubber, and prevents the rough surface of the straw stuffing from wrinkling the outer surface of the rubber. It is in this construction that my invention consists.

The drawing denotes a cross-section of one side of a collar embodying my invention.

$a$ denotes the roll, $b$ the body, filled with straw stuffing $c$, in the usual manner. $d$ is the facing of rubber extending around the inner surface of the body, from the roll $a$ on one side to the patent or outer leather $e$ on the opposite side, as seen in the drawing. Before stitching its inner edge to the roll, the strip of leather $f$ is cemented along its inner surface, and a similar strip, $g$, is cemented along the inner surface of the opposite edge. Then the rubber with its reinforced edges is laid over and drawn around the stuffing or body $b$, (the sheet or layer of kersey $h$ being interposed between the rubber and the straw,) and is stitched to the roll leather and to the outer leather $e$, as will be readily understood.

By these means it will be seen that I not only so secure the rubber upon the body, that while retaining its elasticity its edges are strengthened in such a manner as to prevent the rubber from tearing away, but I cushion the rubber upon an interposed soft but strong material, which, unlike leather, cannot grow stiff and hard, and which acts perfectly to shield the rubber from the uneven surface of the straw.

I claim a horse-collar, the bearing surface of which is made of rubber or rubber compound, when the edges of such rubber are reinforced to enable the rubber to be secured in position, substantially as set forth.

Also, in combination with the above, I claim interposing between the rubber and the stuffing $c$ the cloth $h$, substantially as and for the purpose described.

WM. LEONARD.

Witnesses:
  J. B. CROSBY,
  FRANCIS GOULD.